July 14, 1970     J. L. SZWARGULSKI     3,520,330

POROUS BALL VALVE OR THE LIKE

Filed March 21, 1968

INVENTOR
JESSE L. SZWARGULSKI

BY *Edward H Casey*

ATTORNEY 3,520,330
POROUS BALL VALVE OR THE LIKE
Jesse L. Szwargulski, Florissant, Mo., assignor to ACF Industries, Incorporated, New York, N.Y., a corporation of New Jersey
Filed Mar. 21, 1968, Ser. No. 715,031
Int. Cl. F16k 15/14; F02m 7/00
U.S. Cl. 137—613            4 Claims

ABSTRACT OF THE DISCLOSURE

A valve such as a ball check valve, is provided which permits a slow flow when the valve is in its closed position. The ball, preferably, is made of porous plastic or metallic material which will not contaminate readily. The motion of the ball during operation enables it continually to present new clean surfaces to the flowing fluid and helps the ball to rid itself of contamination. The valve is used to control an air motor in a carburetor.

BACKGROUND OF THE INVENTION

Some types of self closing valves are designed to permit limited flow when the valve is closed. One class of such valves is known as excess flow valves. These valves close in response to an excessive flow and then permit only a limited flow. A valve arrangement which permits a restricted flow in one direction and a much greater rate of flow in the opposite direction is shown in Pat. 3,190,623 to T. M. Ball in Class 261, Subclass 39. The restricted flow is obtained by an extremely small passage shunting a ball check valve. Such a restricted passage may readily become clogged. Excess flow valves, on the other hand, tend to be rather complex.

SUMMARY OF THE INVENTION

The valve according to the invention may be used to control the rate of opening of a carburetor choke valve of an automobile gasoline engine. When the rate of choke valve opening is controlled by an orifice, which has a diameter of only a few mils, even a partial clogging greatly affects the rate of choke valve opening. The present invention obviates this difficulty by avoiding the restricted orifice altogether, and using instead a permeable or porous valve member. Preferably the moving element of the valve is made porous, and the moving element is preferably in the form of a ball, since a ball is likely to have the maximum amount of movement. The rotation and jolting of the ball enables it to change its effective permeable surface continually and tends to keep it clean. The porous ball is made of a non-absorbent material. Porous "Teflon" is a desirable material, and other plastic materials, and sintered stainless steel or bronze may be suitable, depending on the fluid or gas flowing through the valve. The ball of the valve is smooth and polished to minimize the adhesion of contaminants.

DESCRIPTION OF THE PREFERRED EMBODIMENTS

Figure 1:
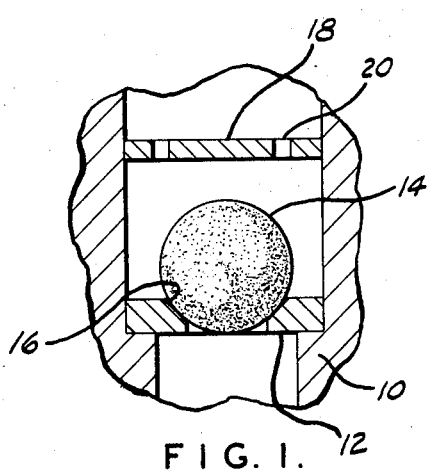
Figure 2:
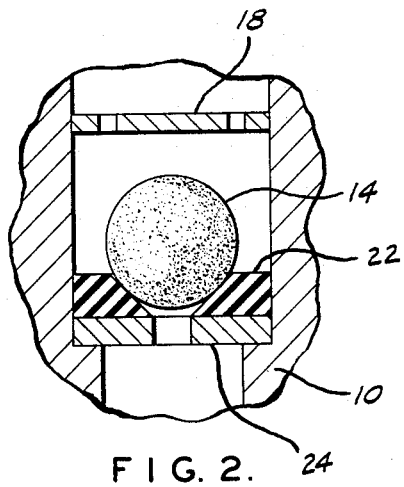
Figure 3:
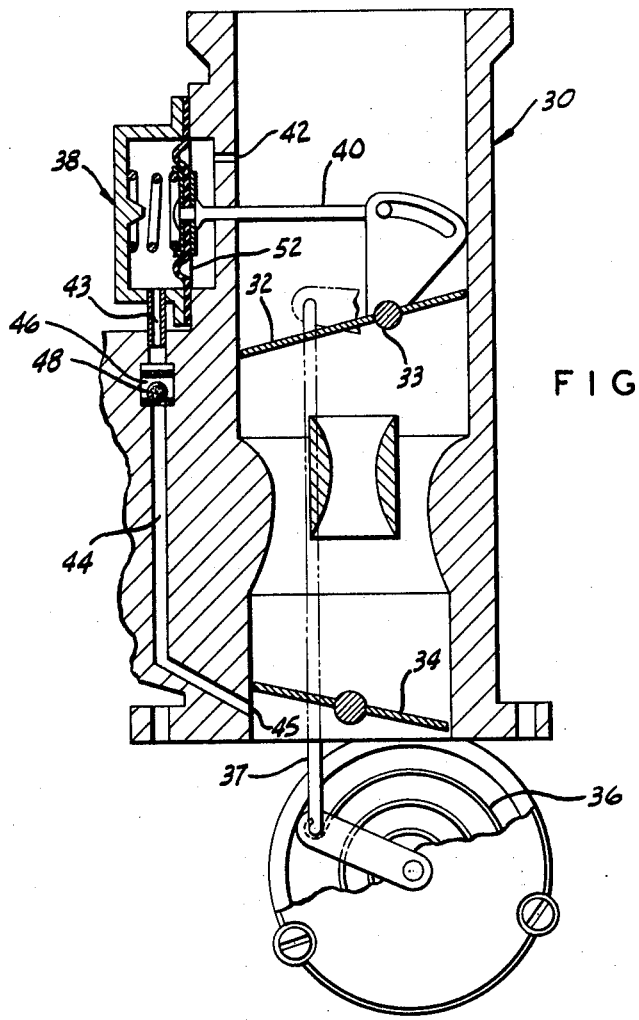

The invention is illustrated in the accompanying drawing, wherein:
FIG. 1 is a sectional view showing a preferred embodiment of the invention.
FIG. 2 is a sectional view of an alternative valve.
FIG. 3 is a partial view of a carburetor embodying a valve according to the invention.

An illustration of the essential elements of the invention is presented in FIG. 1. A valve body or conduit 10 for fluid, such as air, is provided with a valve seat member 12, having a valve ball 14 adapted to nest in the seat 16 of member 12. The latter may be fixed in body 10 by any suitable means. Barrier 18 is likewise fixed in the valve body 10 to confine the ball 14, but provide passages 20 for the fluid. It will be apparent that, if desired, the ball 14 may be spring biased by a spring between it and barrier 18, for example, as is common in ball check valves. A check valve of the type shown in FIG. 1 permits flow in the forward or upward direction and restricts flow in the reverse or downward direction. It is necessary, however, in some applications of check valves to permit bleeding or limited flow in the reverse direction. This is accomplished in the present invention by making at least one of the valve elements, preferably ball 14, of a porous or permeable material. A number of such plastic and metallic materials are known. Thus, ball 14 can be made of porous "Teflon" or "KEL–F," both of which are commercially available in porous form. Other porous plastic materials are sold under the trade name of "Vyon" and "Porvic" by Pritchett & Gold and E.P.S. Co. Ltd., Essex, England. Suitable known porous metals are sintered porous stainless steel and other sintered powdered or fibrous metals. Examples of porous stainless steel materials are described in Pats. 2,721,378; 3,127,668 and 3,237,812. Examples of additional plastic porous materials are disclosed in Pats. 2,757,100 and 2,766,485. The various materials mentioned above have porosities making them permeable to air or liquid.

To improve the seating of ball 14 and reduce leakage between ball 14 and seat 12, the latter may be made of a resilient material such as an artificial rubber which is soft relative to ball 14. The seat member, as shown in FIG. 2, may include a flexible or resilient seat ring 22 mounted on a base 24, which may be a solid metal ring. Resilient ring 22 can have any suitable cross sectional form and be made of any material which will not tend to stick to the material of ball 14.

A particular application of a porous check valve is illustrated in FIG. 3, showing an arrangement similar to that of Pat. 3,190,623 for controlling the choke valve of a carburetor. The air horn or body 30 of the carburetor has the usual choke valve 32 and throttle valve 34. The choke valve 32 is adapted to be opened by thermostat 36 through linkage 37. For reasons explained in said patent, it is desirable to open the choke valve slowly in response to low pressure downstream of the throttle when the engine starts, before the thermostat may begin to open the choke valve.

For this purpose an air motor 38 is connected by linkage 40 to choke 32, which is pivoted at 33. One side of the air motor 38 is vented at 42 and the other side has air passages 43, 44 opening at 45 into the air horn 30 below throttle 34. An enlarged portion 46 between air passages 43 and 44 forms a valve chamber or body containing a permeable ball 48, forming a check valve of the type shown in FIG. 1.

In operation, when the engine starts the pressure below throttle 34 drops, and air flows slowly from air motor 38 through passage 43, permeable ball 48 and passage 44. The air pressure on the right side of diaphragm 52 causes it to move to the left, and linkage 40 turns choke 32, opening it against the tension of thermostat 36. If, after the air motor 38 has opened the choke, the air pressure at 45 increases, valve 48 will open. The air motor 38 will not be actuated appreciably during cranking of the engine although the pressure fluctuates at opening 45 during cranking, because the downward air flow is very limited, and any air drawn off from air motor 38 will be quickly restored through valve 46, 48. It is apparent, then, that valve 46, 48 permits delayed actuation and fast restoration of air motor 38.

The embodiments of the invention herein disclosed are preferred forms thereof, but it is quite obvious that the invention can be embodied in various other well known types of valves, and therefore the scope of the invention is not to be construed as limited except as defined in the following claims.

I claim:
1. A valve comprising a body having a fluid passage; a valve seat in said fluid passage provided with an orifice; and a ball valve member movable relative to said valve seat and adapted to nest therein for opening and closing the orifice in said valve seat, characterized in that said ball valve member is made entirely of fluid permeable material.

2. A valve according to claim 1 located in an air conduit of a carburetor having an air horn, a choke valve and a throttle valve in said air horn, an air motor for actuating said choke valve, said air conduit connecting said air motor to a point in said air horn downstream of said throttle valve, whereby the valve in said air conduit controls the rate of opening and closing of the choke valve by said air motor differentially.

3. A valve according to claim 1, wherein said permeable material is a porous plastic material.

4. A valve according to claim 1, wherein said seat member includes a resilient ring seat for said ball valve member.

References Cited

UNITED STATES PATENTS

| | | | |
|---|---|---|---|
| 2,853,159 | 9/1958 | Kuhn | 137—513.3 X |
| 3,190,623 | 6/1965 | Ball | 123—119 X |
| 3,326,230 | 6/1967 | Frank | 137—199 |
| 3,346,008 | 10/1967 | Scaramucci | 137—533.15 X |

ALAN COHAN, Primary Examiner

U.S. Cl. X.R.

137—503, 513.3, 533.11; 261—39